7990X
J. Meitzel.
Alcohol Still.
Patented Jan. 30, 1834.
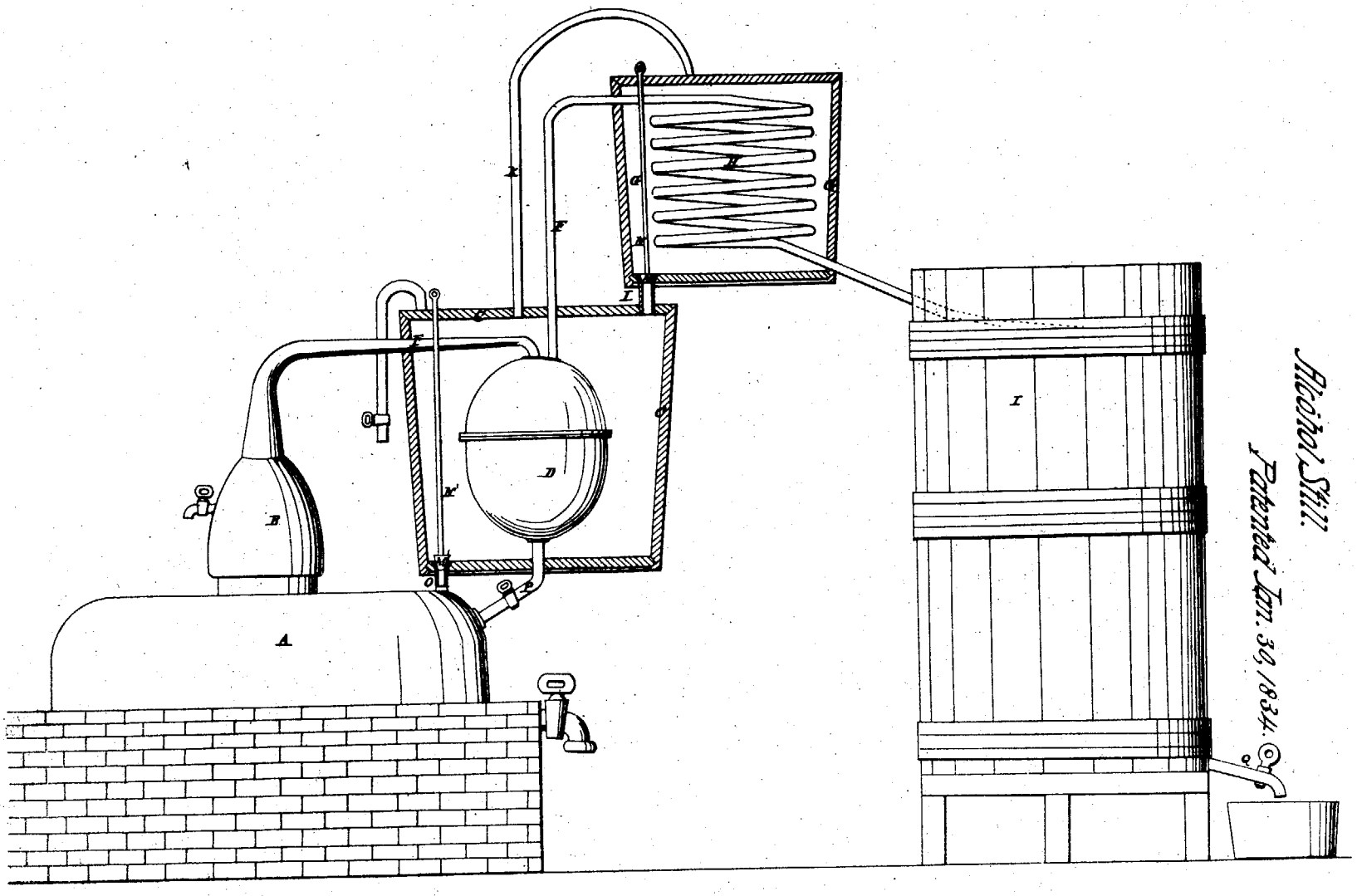

a. 14

Jan. 30. 1834 4

7990X

Jacob Weitzel. City of Lancaster. Pennsylvania.

Letters Patent, Jan. 30. 1834.

The schedule referred to in these Letters Patent and making part of the same containing a description in the words of the said Jacob Weitzel himself of his improvement in the formation of Stills Know all men by these presents. That I Jacob Weitzel of the City of Lancaster and State of Pennsylvania Coppersmith, have invented a new and useful improvement in the formation of Stills, and that the following is a full and exact description of the construction and operation of the said improvement as invented or improved by me, The improvement which he claims is an additional tub to those now in use called a doubling tub, which is placed in part above the still in the centre of which tub the doubler is placed, The beer after being pumped up into the first tub through which the doublings pass by means of a worm becomes somewhat heated, and is then let into the doubling tub round the doubler where it may be made to boil before it is let into the still, and is let into the still by means of a pipe which connect with the bottom of the tub and with the top of the still, which pipe is stopped by a plug made of wood, copper or some other metal, the handle of which extends up through the lid of the tub, which method of letting the beer from one tub into another or from the tub into the still, by means of a plug and pipe this applicant claims as his invention.

The singlings pass out of the still by a long crooked neck into the doubler and by a smaller neck the doublings pass up into a worm, in the first beer tub, thence into the worm in the cooler. As the beer sometimes gets into a boiling state in the doubling tub, a bent tube is made leading from the top of this tub and turning down through the lid of the first tub into the beer, so that no spirits may escape to

1196X to be lost another [illegible] tube proceeds out of the top of the doubling tub at the lower end of which is a spicket to give vent to air while letting the mash down into the still.

Another small tube with a cock is taken out of the bottom of the doubler, through the bottom of the doubling tub and extending down into the still for the purpose of conveying into the still the low wines that may remain after the liquor is run off also another cock on the head of the still for the purpose of letting off the air while the still is filling from the doubling tub.

Witness

Millet C. Ogilby }
Samuel F. Dale }

Jacob Weitzell

Drawing 518 207

E.L.
C.Y.W.